Figure 1:
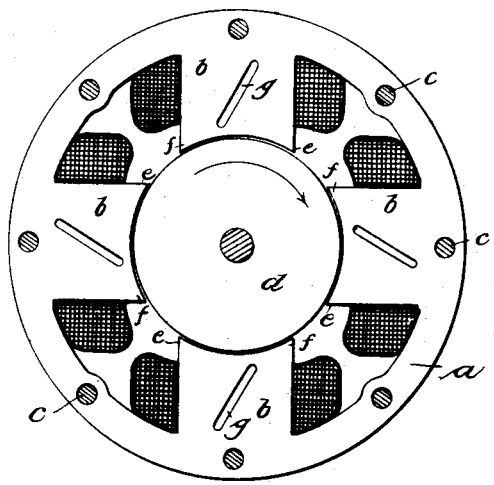

No. 713,604. Patented Nov. 18, 1902.
A. CHURCHWARD.
DYNAMO ELECTRIC MACHINE.
(Application filed Jan. 2, 1900. Renewed Dec. 9, 1901.)
(No Model.)

Witnesses
C. J. Schmitt
Max Zabel

Inventor
Alexander Churchward
By Charles A. Brown & Cragg
Attorneys

UNITED STATES PATENT OFFICE.

ALEXANDER CHURCHWARD, OF CHICAGO, ILLINOIS.

DYNAMO-ELECTRIC MACHINE.

SPECIFICATION forming part of Letters Patent No. 713,604, dated November 18, 1902.

Application filed January 2, 1900. Renewed December 9, 1901. Serial No. 85,149. (No model.)

*To all whom it may concern:*

Be it known that I, ALEXANDER CHURCHWARD, a citizen of the United States, residing at Chicago, in the county of Cook and State of Illinois, have invented a certain new and useful Improvement in Dynamo-Electric Machines, (Case No. 293,) of which the following is a full, clear, concise, and exact description, reference being had to the accompanying drawings, forming a part of this specification.

My invention relates to dynamo-electric machines, and has for its object the provision of improved means for overcoming the injurious effects of armature reactions.

My invention is designed more particularly for use in connection with direct-current dynamo-electric machines, as the induction in alternators is not usually of so high a value, the disturbing influences being more effective in direct-current machines. The rotation of an armature in a field of lines of force is usually accompanied by the displacement of the lines of force and the distortion of the uniformity of induction, the lines of force tending to follow in the wake of the armature, thereby increasing the induction at the so-called "trailing" pole-tips with respect to the normal magnetization along the remainder of the surfaces of the pole-shoes opposed to the armature. This tendency of the lines of force to follow the armature occasions difficulties in the operation of dynamo-electric machines, among which may be mentioned an injurious increase of the armature reactions, the distortion of the field increasing with the load thereon. Magnetic leakage also takes place to an increased extent, thereby decreasing the general efficiency of the machine. The effect of this increased armature reaction is to cause sparking effects at the commutator, which in some instances makes it necessary to change the position of the brushes upon changes in load. This latter means for counteracting the injurious armature reactions is obviously difficult of attainment when the machines are used as motors upon motor-driven vehicles. Other means have been employed for overcoming these defects—such as lamination of the pole-shoes in a particular direction, provision of auxiliary magnets, or the like—many of which increase the cost of construction and maintenance considerably. I provide an improved means for eliminating these defects and to increase the inherent tendency of the machine to regulate itself automatically.

In order to deflect the lines of force more closely toward the entering pole-tip and to prevent the same from congregating at the leading pole-tip, I provide a slot in each polar projection which preferably extends diagonally with relation to the polar axis. A single slot thus disposed is effective where the armature of the machine is to run in one direction only. Where the armature is adapted to run in either direction, I preferably provide two diagonal slots in each polar projection, one slot in each pole acting in the above-mentioned capacity when the armature is running in one direction, while the remaining slot acts in the same capacity when the direction of rotation of the armature is reversed. In practicing my invention I also preferably chamfer a portion of each of the pole-tips in order to distribute the flux which tends to concentrate at the entering pole-tips, the lines of force then emanating from a larger pole area and being more evenly distributed over the armature-surface, by which means the plane of commutation is displaced but slightly, and while it may not coincide with the neutral plane, it may be so chosen that the conductors of the armature which are under commutation will then more readily permit of the reversal of current therethrough at any load.

Where the machine is dsigned to rotate in both directions, it is obvious that what at one time may be the trailing pole-tips are at another the entering pole-tips. I therefore chamfer, preferably, about one-half of each pole-tip, by which arrangement I am enabled to reduce the injurious effects of armature reactions and at the same time do not impair the effectiveness of the entering pole-tips, as a portion of each entering pole-tip remains intact, being thereby brought within effective range of the armature.

I will explain my invention more fully by reference to the accompanying drawings, illustrating the preferred embodiments thereof, in which—

Figure 2:
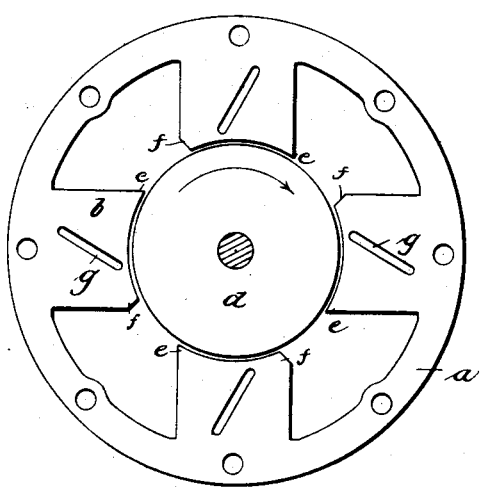
Figure 3:
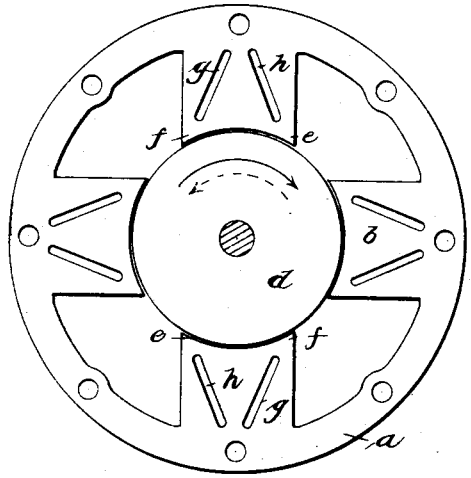
Figure 4:
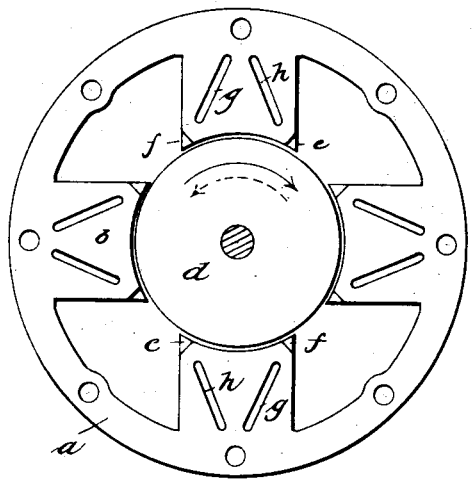

Figure 1 is a side view of a field-core, the field-coils being shown in section, while the armature is diagrammatically indicated. Figs. 2, 3, and 4 are similar views showing different embodiments of the invention, the field-coils being removed.

Like parts are indicated by similar characters of reference throughout the different figures.

I have shown each field-core as being comprised of circular laminæ $a$, provided with inwardly-extending projections $b\ b$, which form the polar extensions of the field-core. In Fig. 1 I have indicated bolts $c\ c$ passing through the laminæ for securing them together. An armature $d$ is diagrammatically indicated within each field-core. In Figs. 1 and 2 I have shown machines whose armatures are confined to the single direction of rotation indicated by the arrows. In Figs. 3 and 4 I have shown machines whose armatures may be rotated in either direction.

In the machine shown in Figs. 1 and 2 the tips $e$ constitute the trailing pole-tips, while the tips $f$ constitute the entering pole-tips. In the structures disclosed in Figs 3 and 4 pole-tips $e$ and $f$ are respectively trailing and entering pole-tips when the armatures rotate in the direction indicated by the arrows shown in full lines, while they constitute, respectively, the entering and trailing pole-tips when the armatures are running in the reverse direction indicated by the dotted arrows. As has been said, the lines of force tend to congregate or bunch at the trailing pole-tips, due to their tendency to follow the armature, which results injuriously, as heretofore pointed out. I am enabled to accomplish a very effective and proper distribution of the lines of force with the armatures of the various machines running in the direction indicated by the arrows in full lines by providing diagonal air-gaps $g\ g$, extending longitudinally of the armature-shaft. These air-gaps serve to choke the lines of force flowing from the field-ring to those portions of the polar projections between the air-gaps and the trailing pole-tips, while permitting free passage of the lines of force to the entering pole-tips. The lines of force preferably passing between the slots and the entering pole-tips instead of congesting at the trailing pole-tips are partially distributed between the slots and the trailing pole-tips. By means of these diagonal slots I am enabled to effect a more uniform distribution of the lines of force. Where the machine is designed to have its armature rotate in both directions, additional slots $h\ h$ may be employed, which serve in the same capacity as the slots $g\ g$ when the armatures run in the direction indicated by the dotted arrows.

To further adjust the flux of the magnetic lines of force, I preferably chamfer or partially chamfer each of the entering pole-tips, as shown in Fig. 2, or each of the pole-tips, as shown in Fig. 4.

It is obvious that changes may readily be made in the embodiment of my invention herein shown and particularly described, and I do not, therefore, wish to be limited to the precise construction shown; but,

Having thus described my invention, I claim as new, and desire to secure by Letters Patent, the following:

1. A field-core for dynamo-electric machines, having a polar projection provided with a diagonal slot, substantially as described.

2. A field-core for dynamo-electric machines, having a polar projection provided with a diagonal slot extending longitudinally of the axis of rotation of the armature, substantially as described.

3. A field-core for dynamo-electric machines, having a polar projection provided with a diagonal slot, and having a chamfered pole-tip, substantially as described.

4. A field-core for dynamo-electric machines, having a polar projection provided with a diagonal slot extending longitudinally of the axis of rotation of the armature, and having a chamfered pole-tip, substantially as described.

5. A field-core for dynamo-electric machines, having inwardly-extending radial projections each provided with a slot extending diagonally across the same, substantially as described.

6. A field-core for dynamo-electric machines, having inwardly-extending radial projections each provided with a slot extending diagonally across the same and extending longitudinally of the axis of rotation of the armature, substantially as described.

7. A field-core for dynamo-electric machines, having inwardly-extending radial projections each provided with a slot extending diagonally across the same, the tips of said poles being chamfered, substantially as described.

8. A field-core for dynamo-electric machines, having inwardly-extending radial projections each provided with a slot extending diagonally across the same and extending longitudinally of the axis of rotation of the armature, the tips of said poles being chamfered, substantially as described.

9. A circular field-core for dynamo-electric machines, having inwardly-extending radial projections each provided with a slot extending diagonally across the same, substantially as described.

10. A circular field-core for dynamo-electric machines, having inwardly-extending radial projections each provided with a slot extending diagonally across the same and extending longitudinally of the axis of rotation of the armature, substantially as described.

11. A circular field-core for dynamo-electric machines, having inwardly-extending radial projections each provided with a slot extending diagonally across the same, the tips of said poles being chamfered, substantially as described.

12. A circular field-core for dynamo-electric machines, having inwardly-extending radial projections each provided with a slot extending diagonally across the same and extending longitudinally of the axis of rotation of the armature, the tips of said poles being chamfered, substantially as described.

13. A field-core for dynamo-electric machines, having a polar projection provided with two diagonal and oppositely-inclined slots, substantially as described.

14. A field-core for dynamo-electric machines, having a polar projection provided with two diagonal and oppositely-inclined slots which extend longitudinally of the armature, substantially as described.

15. A field-core for dynamo-electric machines, having a polar projection provided with two diagonal and oppositely-inclined slots which extend longitudinally of the armature, the tips of said pole being chamfered, substantially as described.

16. A field-core for dynamo-electric machines, having polar projections each provided with two diagonal and oppositely-inclined slots, substantially as described.

17. A field-core for dynamo-electric machines, having polar projections each provided with two diagonal and oppositely-inclined slots, which extend longitudinally of the armature, substantially as described.

18. A field-core for dynamo-electric machines, having polar projections each provided with two diagonal and oppositely-inclined slots, which extend longitudinally of the armature, the tips of each pole-piece being chamfered, substantially as described.

In witness whereof I hereunto subscribe my name this 21st day of December, A. D. 1899.

ALEXANDER CHURCHWARD.

Witnesses:
H. D. ZAHISKIE,
FRED. J. HARTMAN.